US012773946B1

(12) United States Patent
Weinman et al.

(10) Patent No.: US 12,773,946 B1
(45) Date of Patent: Oct. 27, 2026

(54) REAR SPOILER HAVING AMBIENT LIGHTING AND A HIGH MOUNTED STOP LAMP

(71) Applicant: Honda Motor Co., Ltd., Tokyo (JP)

(72) Inventors: Dakota E Weinman, Dublin, OH (US); David J Rose, West Mansfield, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/248,912

(22) Filed: Jun. 25, 2025

(51) Int. Cl.
*B60Q 1/44* (2006.01)
*B60Q 1/26* (2006.01)
*B60Q 1/30* (2006.01)
*B62D 35/00* (2006.01)

(52) U.S. Cl.
CPC ............. *B60Q 1/44* (2013.01); *B60Q 1/2669* (2013.01); *B60Q 1/302* (2013.01); *B62D 35/007* (2013.01)

(58) Field of Classification Search
CPC ........ B60Q 1/44; B60Q 1/2669; B60Q 1/302; B62D 35/007
See application file for complete search history.

(56) References Cited

U.S. PATENT DOCUMENTS 8,113,695 B2 * 2/2012 Meinke ................... B60R 13/00 362/351
2006/0220825 A1 * 10/2006 Mertens ............... B60Q 1/2607 340/479
2010/0026045 A1 * 2/2010 Thomas ............... B62D 35/007 296/180.1
2014/0077525 A1 * 3/2014 Yoshimura ........... B62D 35/007 296/180.1
2017/0246985 A1 * 8/2017 Dellock ................. B60Q 1/302
2018/0312204 A1 * 11/2018 Schellekens ............ B29C 45/16
2025/0050803 A1 * 2/2025 Lee ...................... B62D 35/007

FOREIGN PATENT DOCUMENTS

| | | | |
|---|---|---|---|
| CN | 104875673 | A | 9/2015 |
| CN | 214292813 | U | 9/2021 |
| CN | 217969686 | U | 12/2022 |
| CN | 116587974 | A | 8/2023 |
| DE | 8027760 | U1 | 2/1981 |
| ES | 1187035 | U | 7/2017 |
| JP | 2010149754 | A | 7/2010 |
| JP | 2010149758 | A | 7/2010 |
| JP | 20112040786 | A | 12/2011 |
| JP | 2012121423 | A | 6/2012 |

* cited by examiner

*Primary Examiner* — Evan P Dzierzynski
(74) *Attorney, Agent, or Firm* — Plumsea Law Group, LLC

(57) ABSTRACT

A spoiler having a high-mounted stop light, and a rear ambient light is disclosed. The spoiler includes an inner component secured to the tailgate skin and an outer component secured to the inner component to define a spoiler chamber therebetween. The outer component includes an upper portion and a lower portion. An upper opening is defined in the upper portion. A lower opening is defined jointly between the upper portion and the lower portion. The high-mounted stop light is disposed within the spoiler chamber to illuminate though the upper opening. The rear ambient light is disposed within the spoiler chamber to illuminate through the lower opening.

4 Claims, 9 Drawing Sheets

REAR SPOILER HAVING AMBIENT LIGHTING AND A HIGH MOUNTED STOP LAMP

BACKGROUND

The disclosure herein relates to a rear spoiler for a vehicle and, more particularly, to a rear spoiler including rear ambient lighting to serve, for example, as enhanced lighting for vehicle visibility or as a styling option, while not interfering with the function of the Center High Mount Stop Light (CHMSL).

Rear spoilers are a common accessory on many vehicle designs. Spoilers include any of a wide range of structures that attach to the exterior of a vehicle body to disrupt, or "spoil" disadvantageous airflow around the vehicle in order to guide the air flow (which is separating from the body of the vehicle) toward a desired direction. Spoilers may reduce drag, and may also reduce lift, to help the vehicle achieve improved performance. Namely, a spoiler may allow a vehicle to achieve improved fuel efficiency or improved stability at high speeds.

Vehicles including sport utility vehicles may also include rear ambient lighting. Such lighting is disposed adjacent an exterior surface of the vehicle so as be visible from the exterior of the vehicle. Such rear ambient lighting may serve as a styling differentiator, and also increases safety via improved vehicle visibility. However, when rear ambient lighting is applied to a vehicle, there are limited allowable locations for the placement of the CHMSL due to regulations requiring that rear ambient lighting be located on the vehicle at a location separate from the CHMSL. In particular, regulations require that high mounted stop lamps are not permitted to be combined with any other lamp of the vehicle, including rear ambient lighting. There is thus a need in the art for a system and device to provide ambient lighting in and around the rear spoiler and provide the CHMSL in compliance with applicable regulations.

SUMMARY

In one aspect, a motor vehicle is provided, and in a first embodiment the motor vehicle includes a tailgate. A spoiler is attached to the tailgate. The spoiler includes a high-mounted stop light and a rear ambient light.

In a first alternative of the first embodiment the motor vehicle is a sport utility vehicle, and the high-mounted stop light is a center high-mounted stop light.

In a second alternative of the first embodiment, the center high-mounted stop light is incorporated into the spoiler at a location on the vehicle above the rear ambient light.

In a second embodiment, a motor vehicle includes a rear windshield opening and a spoiler secured to the motor vehicle above the rear windshield. The spoiler includes a high-mounted stop light and a rear ambient light.

In a first alternative of the second embodiment, the motor vehicle includes a roof, and a spoiler secured to the roof.

In a second alternative of the second embodiment, the high-mounted stop light is a center high-mounted stop light and is secured to the spoiler above the rear ambient light.

In a third embodiment, a motor vehicle spoiler includes a spoiler inner component and a spoiler outer component secured to the spoiler inner component to define a spoiler chamber therebetween. A high-mounted stop light is disposed within the spoiler chamber. A rear ambient light is secured within the spoiler chamber.

In a first alternative of the third embodiment, the high-mounted stop light is secured within the spoiler chamber above the rear ambient light.

In second alternative of the third embodiment, the spoiler outer component includes a spoiler upper portion, and a spoiler lower portion disposed beneath the spoiler upper portion.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct embodiment as defined by the claims. Any feature or element of any embodiment may also be combined with features or elements from other embodiment to form another distinct embodiment as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
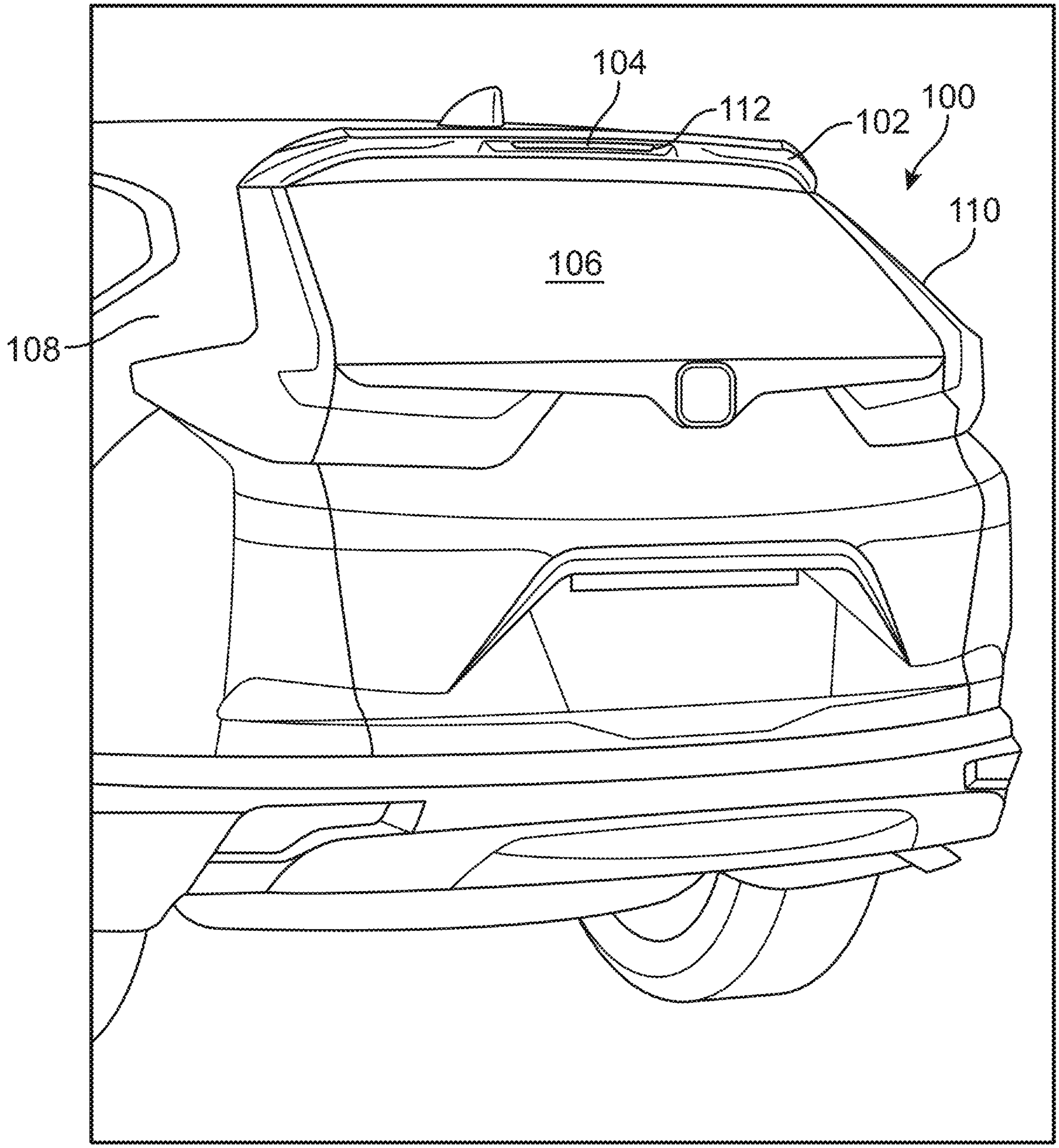
FIG. 1 is an isometric view of a sport utility vehicle with a spoiler.
Figure 2:
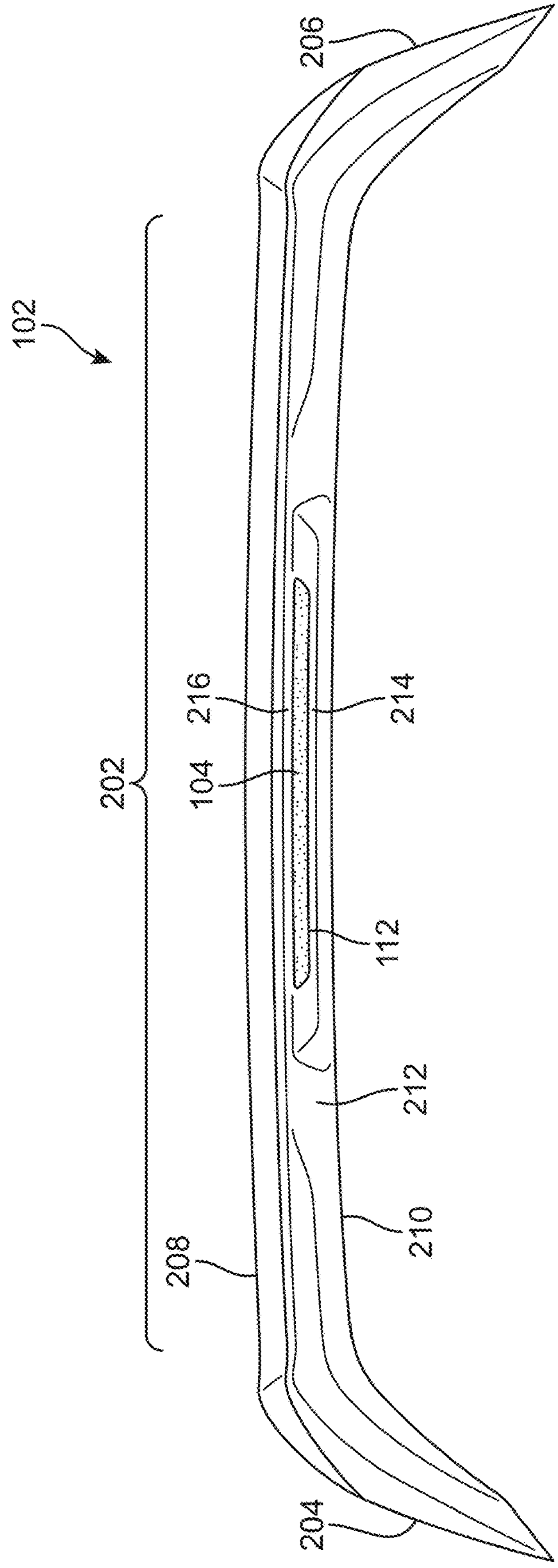
FIG. 2 is a rear elevation view of the spoiler shown in FIG. 1.
Figure 3:
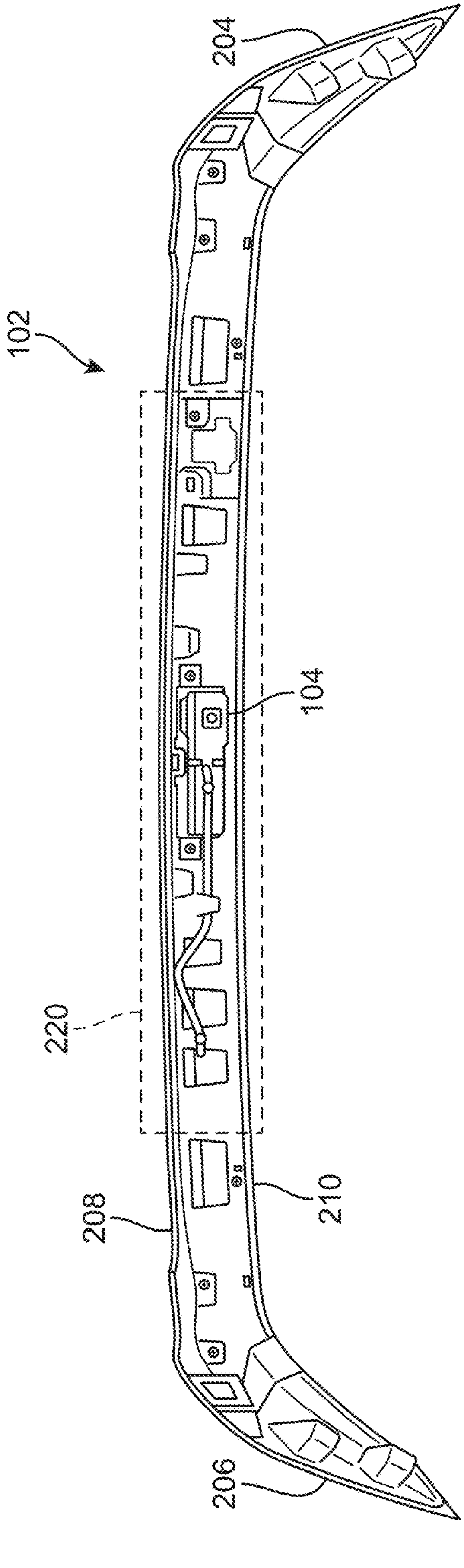
FIG. 3 is a front elevation view of the spoiler shown in FIG. 2.
Figure 4:
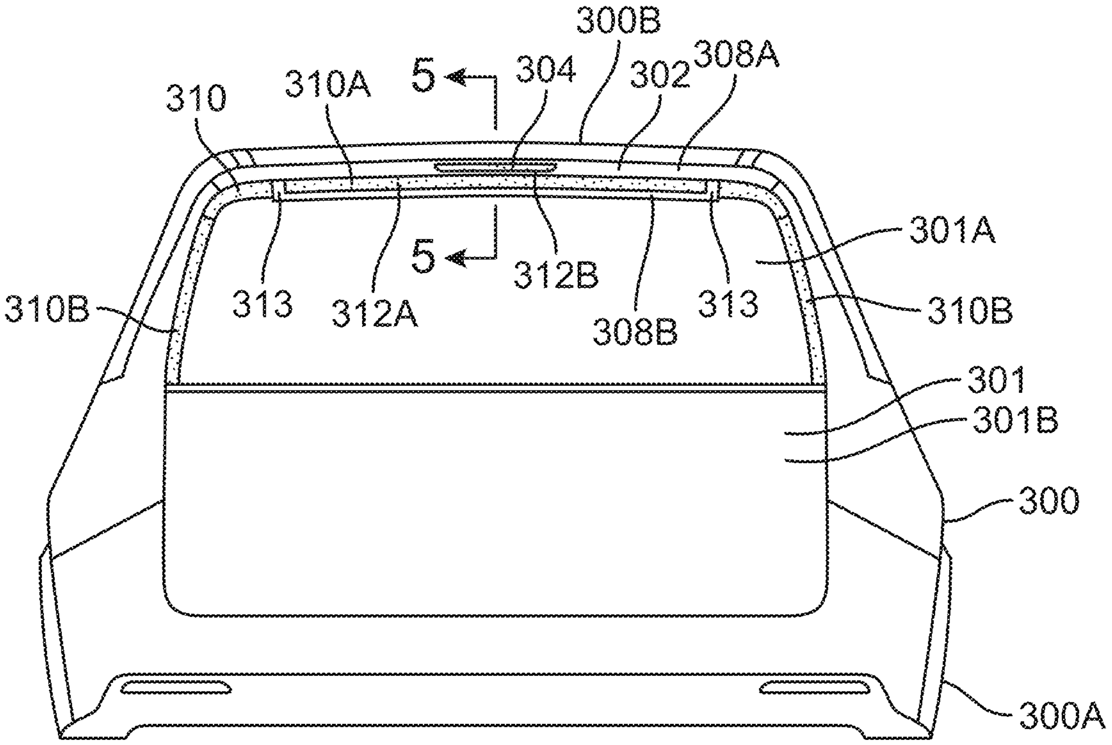
FIG. 4 is a rear elevation view of the spoiler according to the disclosure.
Figure 5:
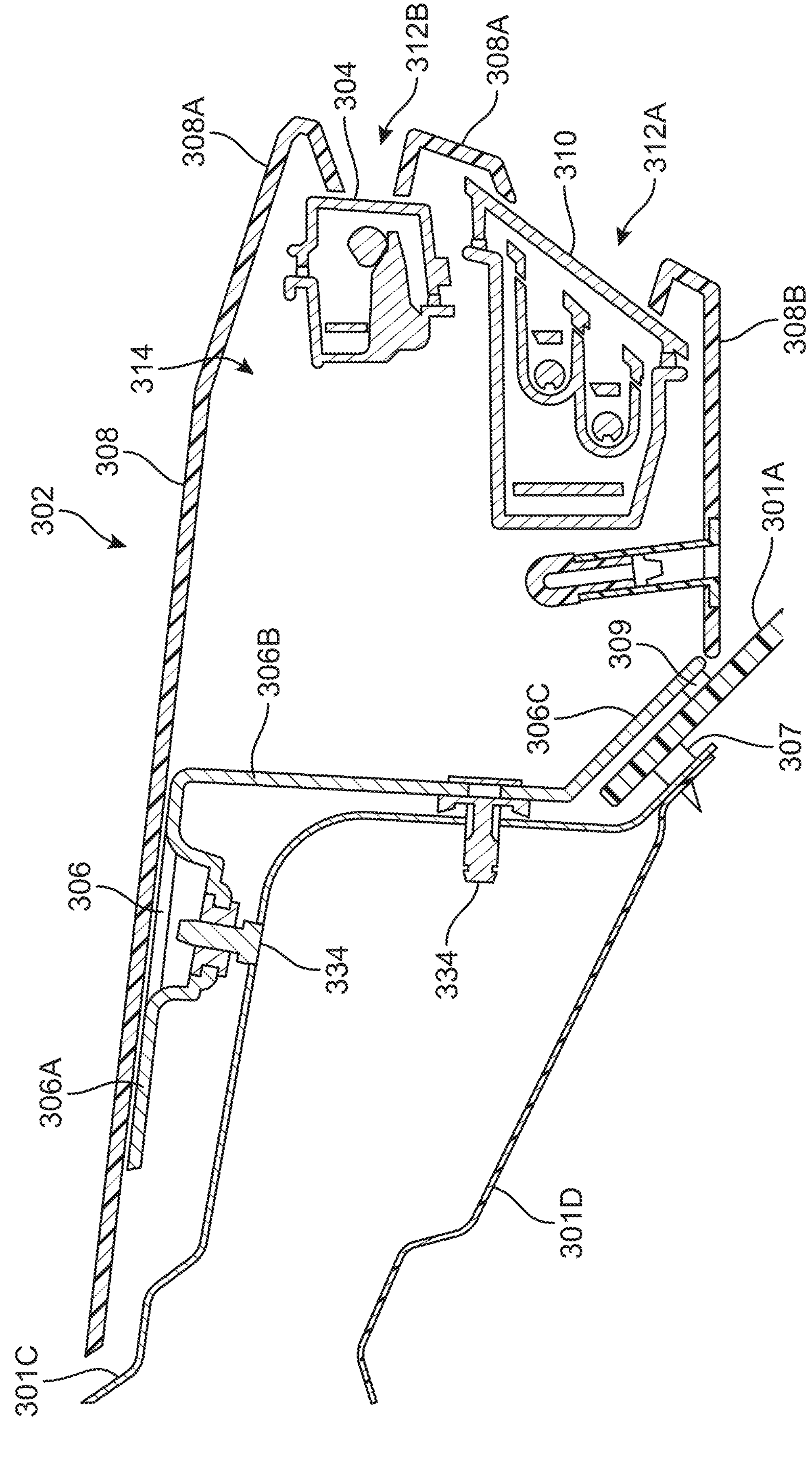
FIG. 5 is a cross-sectional view of the spoiler along line A-A of FIG. 4.
Figure 6:
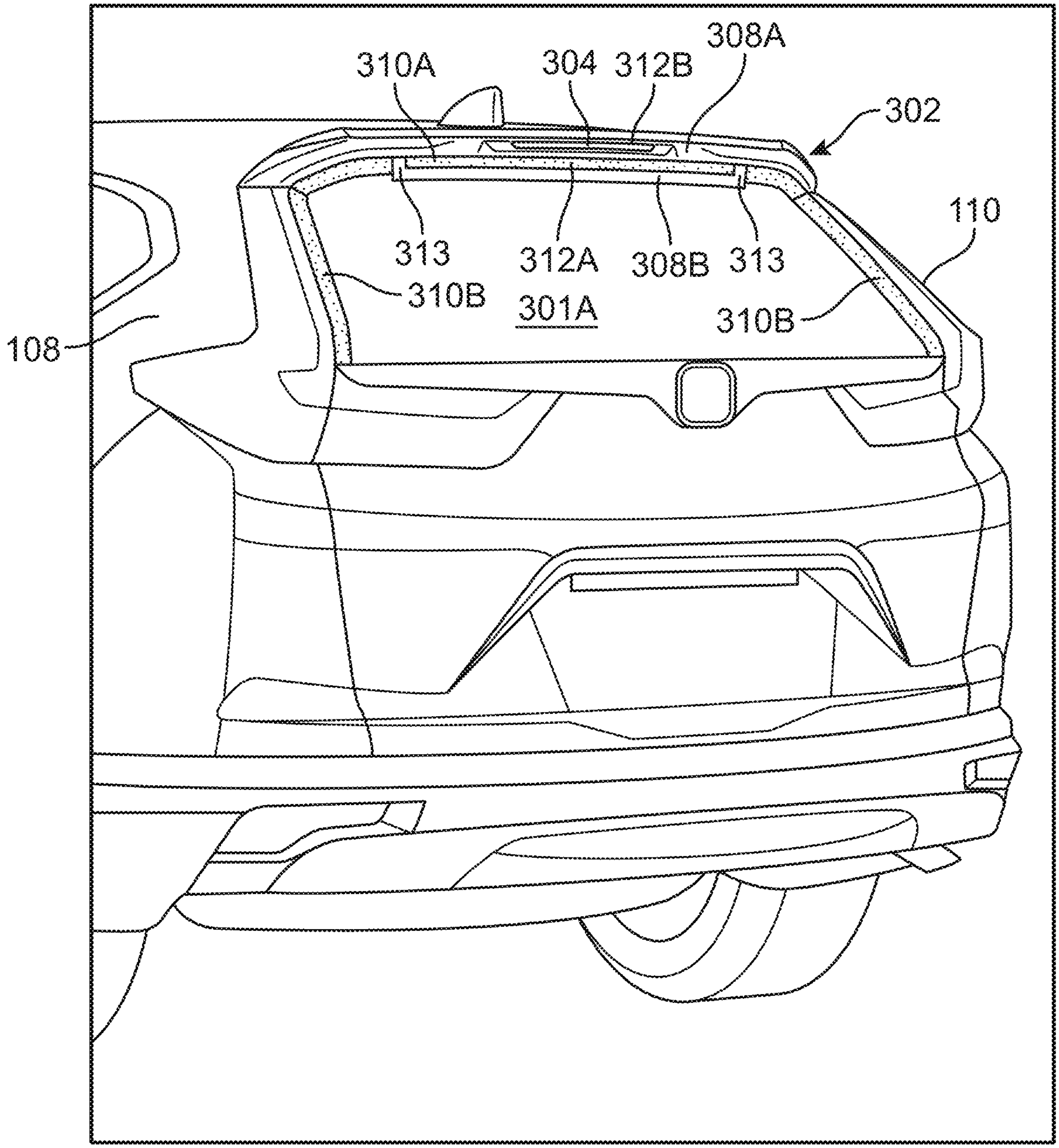
FIG. 6 is an isometric view of a sport utility vehicle incorporating the spoiler shown in FIGS. 4-5.
Figure 7:
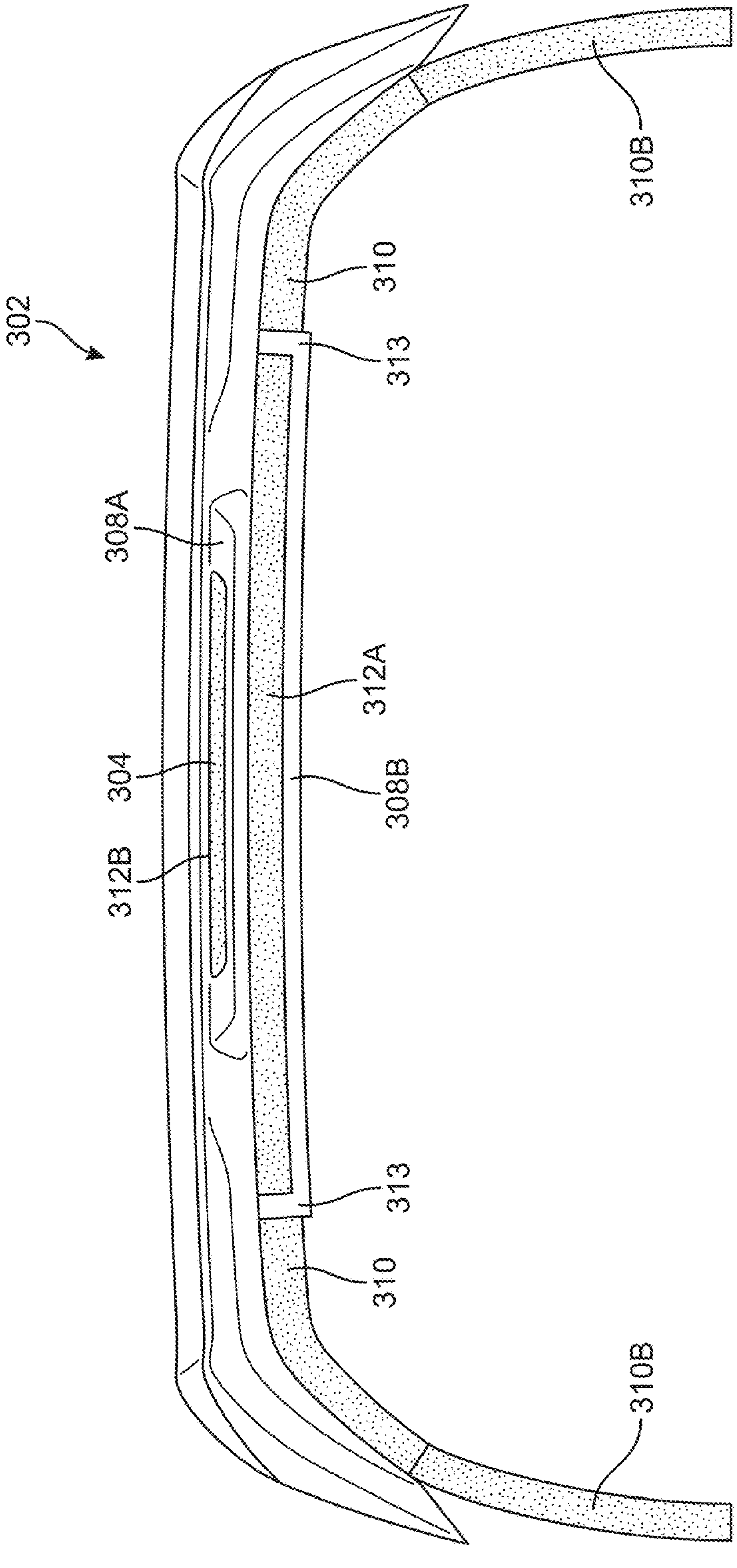
FIG. 7 is a rear elevation view of the spoiler shown in FIGS. 4-5.

With reference to FIGS. 1-3, the general components of a vehicle rear windshield and body area are described for context for the disclosure. A Center High Mount Stop Light (CHMSL) is typically positioned near or within rear spoilers of SUVs to signal braking of the vehicle. The CHMSL allows motorists behind the vehicle to detect when the vehicle is braking. FIG. 1 is an isometric view of vehicle 100 with having rear spoiler 102. Vehicle 100 is a sport utility vehicle; however, the rear spoiler may be used with any type of vehicle having a rearward-facing surface, including sedans and coupes. Vehicle 100 has first lateral side 108 of vehicle 100 and second lateral side 110 opposite first lateral side 108. Rear spoiler 102 extends rearwardly from a roof of vehicle 100 in a position situated above rear window (or windshield) 106 of vehicle 100. It is understood that the rear spoiler may be situated in another location on other vehicles. Rear spoiler 102 extends horizontally from first lateral side 108 of vehicle 100 to second lateral side 110 of vehicle 100. Rear spoiler 102 includes CHMSL 104 that is centered within rear spoiler 102 and visible through first cutout/opening 112 of rear spoiler 102. When a brake of vehicle 100 is applied, CHMSL 104 lights up to indicate that the vehicle is slowing down and/or stopping. CHMSL components commonly include light emitting diodes and an electrical circuit powering and controlling the light emitting diodes.

FIG. 2 is a rear elevation view of rear spoiler 102 in isolation from vehicle 100. The outer body of rear spoiler 102 includes first outer surface 208 and second outer surface 210 opposite first outer surface 208. In the orientation shown in FIG. 2, first outer surface 208 is a top or upper outer surface and second outer surface 210 is a bottom or lower outer surface. The center region 202 of rear spoiler 102 is substantially flat along a first outer surface 208 of rear spoiler 102 and along a second outer surface 210 of rear spoiler 102. Rear spoiler 102 curves at first lateral region 204 and at second lateral region 206 opposite first lateral region 204. As shown in FIG. 1, these smooth contours of rear spoiler's center region 202, first lateral region 204, and second lateral region 206 contribute to the fit and finish of the vehicle by following and blending with the lines of vehicle 100. In some embodiments, it is desirable to enhance the fit and finish of the vehicle by minimizing the distance between first outer surface 208 and second outer surface 210 to provide a thin, sleek rear spoiler.

FIG. 3 is a front elevation view of rear spoiler 102 in isolation from vehicle 100. The view in FIG. 3 reveals the innards of rear spoiler 102. Box 220 indicates a portion of rear spoiler 102 where CHMSL 104 and its components can be positioned.

With reference to FIGS. 4-7, a preferred embodiment is shown. Motor vehicle 300, which may be for example a sport utility vehicle, includes rear bumper 300A and roof 300B. Tailgate 301 is pivotably mounted between roof 300B and rear bumper 300A and includes tailgate door 301B, tailgate skin 301C, tailgate upper windshield support component 301D, and rear windshield 301A. Rear windshield 301A is secured on tailgate skin 301C and upper windshield support component 301D in a conventional manner, for example, by epoxy bead 307. Rear windshield 301A covers an opening formed in tailgate door 301B. Spoiler 302 is secured to an upper region of tailgate 301 which is located adjacent the rearward edge of roof 300B, and extends laterally across the rear of vehicle 300.

Spoiler 302 includes spoiler inner component 306 which is folded into three intersecting and approximately planar sections. Upper section 306A includes an indented region and is disposed substantially horizontally over tailgate skin 301C and extends laterally across the rear of vehicle 300. Middle section 306B extends downwardly from upper section 306A, laterally across the rear of the vehicle, and approximately perpendicular to upper section 306A. Lower section 306C extends downwardly outwardly from and forms an obtuse angle with middle section 306B. Lower section 306C is substantially parallel with and extends over the top of an upper area of rear windshield 301A. Upper section 306A and middle section 306B are secured to tailgate skin 301C via conventional screws and washers 334. Lower section 306C is secured onto rear windshield 301A in a conventional manner, for example, via epoxy 309 such that rear windshield 301A is secured between tailgate skin 301C and lower section 306C of spoiler inner component 306.

Spoiler 302 further includes spoiler outer component 308, which is formed by spoiler outer component upper portion 308A and spoiler outer component lower portion 308B. Spoiler outer component upper portion 308A extends over spoiler inner component upper section 306A and is secured thereto in a conventional manner, for example by welding thereon, as described further below. Spoiler outer component lower portion 308B is secured in a conventional manner, for example by welding, at an inner end thereof relative to windshield 301A to a lower edge of spoiler inner component lower section 306C, and extends rearwardly to a location below a lower end of spoiler outer component upper portion 308A. Spoiler outer component 308 and spoiler inner component 306 jointly form spoiler chamber 314 therebetween.

Lower opening 312A is formed through a rearward face of and extends substantially along the entire horizontal extent of spoiler 302. Lower opening 312A is formed between a hooked lower edge of spoiler outer component upper portion 308A and a hooked upper edge of spoiler outer component lower portion 308B. Lower opening 312A includes left and right edges 313 which define the lateral ends thereof. Edges 313 form part of lower portion 308B and extend upwardly to contact the lower surface of upper portion 308A. Upper opening 312B is formed through a rearward face of spoiler upper component upper portion 308A and extends along a portion of the horizontal extent of spoiler outer component upper portion 308A. Upper opening 312B is centered about a plane which extends transversely to rear windshield 301A and along the longitudinal axis of the vehicle. That is, upper opening 312B is centered relative to the vehicle in the lateral direction, extends laterally relative to vehicle 300, and extends longitudinally relative to spoiler 302. In particular, upper opening 312B extends for a first distance along the longitudinal extent of spoiler 302, lower opening 312A extends along the longitudinal extent of spoiler 302 for a second distance, and the second distance is greater than the first distance. Considered relative to the vehicle, upper opening 312B extends for a first distance along the lateral extent of vehicle 302, lower opening 312A extends along the lateral extent of vehicle 300 for a second distance, and the second distance is greater than the first distance.

High-mounted stop light 304 is disposed within spoiler chamber 314 and illuminates through upper opening 312B. Since upper opening is centered relative to the vehicle as described above, high-mounted stop light 304 functions as a CHMSL. Rear ambient light 310 also is disposed with spoiler chamber 314 and illuminates through lower opening 312A. Rear ambient light 310 is disposed at a lower location than high-mounted stop light 304 and includes horizontal section 310A which extends substantially entirely across the width of rear windshield 301A. Therefore, high-mounted stop light 304 extends along a longitudinal extent of spoiler 302 which is substantially equal to the first distance described above, and rear ambient light 310 extends along the longitudinal extent of spoiler 302 substantially equal to the second distance described above. Considered relative to the vehicle, high-mounted stop light 304 is visible for a first distance along the lateral extent of vehicle 302, rear ambient light 310 extends along the lateral extent of vehicle 300 for a second distance, and the second distance is greater than the first distance. High-mounted stop light 304 is visible at a higher location of vehicle 300 than rear ambient light 310.

Rear ambient light 310 includes left and right portions of horizontal section 310A which extend laterally outwardly of spoiler 302 along the upper edge of rear windshield 301A. Rear ambient light 310 also includes two vertical sections 310B which extend downwardly from opposite ends of horizontal section 310A. Vertical sections 310B are disposed along the lateral sides of rear windshield 301A and are also exterior of spoiler 302. Sections 310B are formed as separate elements from horizontal section 310A. However, sections 310B are in contact with the left and right ends of section 310A so as to form an effectively continuous rear ambient light 310.

The structure as described above allows for a vehicle to be provided with both rear ambient light 310 for decorative purposes, as well as high-mounted stop light (CHMSL) 304. Furthermore, the structure is provided in a compact manner, with the entirety of high mounted stop light 304 and at least a substantial portion of rear ambient light 310 supported within spoiler 302. However, high-mounted stop light 304 and rear ambient light 310 are distinct structures, are not combined with each other, and extend horizontally along the vehicle at different distances relative to the ground, to thereby comply with relevant regulations. Furthermore, though the embodiments are disclosed with reference to a sport utility vehicle, it could also be used with a sedan or coupe having a roof and trunk. In such situation, the spoiler would be attached to the rear end of the roof, and extend along the rear windshield.

According to various embodiments, the attachment between certain components of spoiler 302 may include welding. For example, ultrasonic welding, hot gas welding, or radio frequency (RF) welding may be performed to attach components of spoiler 302 to one another. For example, welding may be used to secure spoiler outer component upper portion 308A to spoiler inner component upper section 306A, and to secure spoiler outer component lower portion 308B to spoiler inner component lower section 306C. By welding components together, no mechanical connectors are necessary. In comparison with other attachment techniques, welding creates a stronger bond by melting plastic together and allowing the melted plastics to cool and solidify. The components may have smooth surfaces without bulky connectors, such as protrusions, snaps, tongue & groove connectors, etc. The welds can have a much smaller thickness than any mechanical connectors. By eliminating connectors, even smaller connectors, the smooth surfaces of the rear spoiler components are unencumbered and allow for more space inside the rear spoiler. As a result, the outer dimensions of spoiler 302 may be reduced for an improved fit and finish and spoiler 302 may still allow for a compartment sufficiently large to house CHMSL 304 and rear ambient light 310, and the components needed to incorporate them into the electrical system of the vehicle.

The components of spoiler 302 may be formed from various thermoplastic materials. For example, the components may be formed from Acrylonitrile Butadiene Styrene (ABS), Acrylonitrile-(ethylene-propylene-diene)-styrene (AEPDS), Acrylonitrile styrene acrylate (ASA), acrylonitrile ethylene styrene (AES), polystyrene etc. In some embodiments, the components may be all formed from the same material. For example, outer component 308 and inner component 306 may be made of the same thermoplastic material. In other embodiments, the components may be formed from different materials. For example, outer component 308 may be made of ASA while inner component 306 is made from ABS. The material of the components of the rear spoiler may be selected based upon a variety of factors. For example, it is advantageous for the materials to be selected to be compatible for welding the components together. In some situations, using the same material for all the components that are to be welded ensures successful welding. In other situations, when selecting different materials for different components that are to be welded together, selecting compatible materials can help create successful welds. Compatible materials can include materials that weld together easily to form a strong attachment. For example, materials having similar melting points can weld well together. In some cases, a binder may be used to create the weld. For example, an AES binder may be of ASA.

The materials may also be selected based on manufacturing considerations other than welding capabilities. For example, materials may be selected based on ease of achieving rear spoiler component shapes, such as by molding processes. The materials may further be selected based on strength, durability, flexibility, and weight desired. For example, a material may be selected based on a balance between a light weight and high strength/durability in comparison with other materials.

Figure 8:
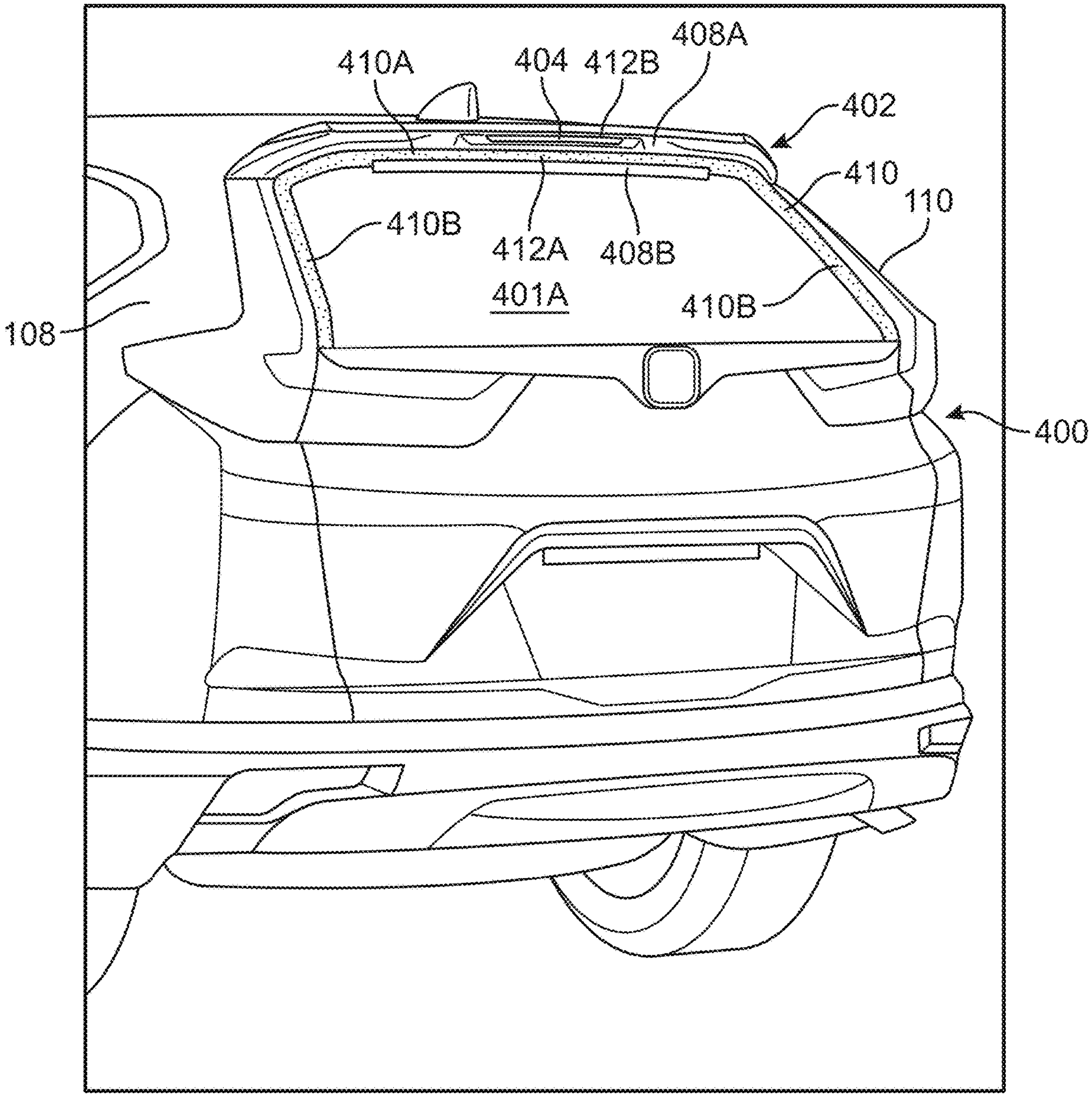
FIG. 8 is an isometric view of a sport utility vehicle incorporating a spoiler according to a further embodiment.
Figure 9:
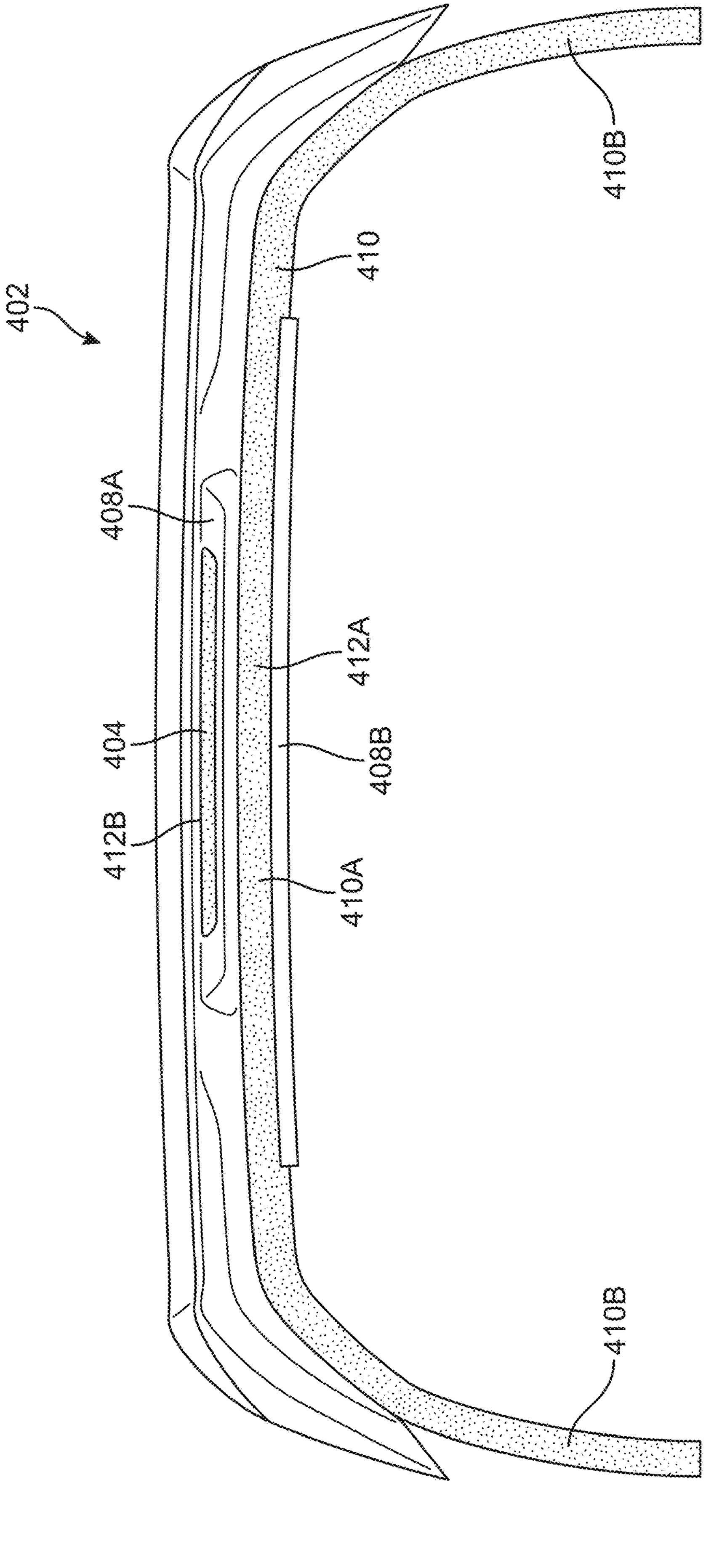
FIG. 9 is a rear elevation view of the spoiler shown in FIG. 8.

With reference to FIGS. 8-9, a further preferred embodiment is shown. Spoiler 402 includes a spoiler inner component (not shown), spoiler outer component 408 and a spoiler chamber (not shown), which are similar to inner component 306, outer component 308 and spoiler chamber 314 of the embodiment of FIGS. 4-7. Spoiler outer component 408 is formed by spoiler outer component upper portion 408A and spoiler outer component lower portion 408B.

Spoiler 402 further includes lower opening 412A is formed through a rearward face of and extends along the entire horizontal extent of spoiler 402, and upper opening 412B. Upper opening 412B is centered about a plane which extends transversely to rear windshield 401A and along the longitudinal axis of vehicle 400. That is, upper opening 412B is centered relative to the vehicle in the lateral direction, extends laterally relative to vehicle, and extends longitudinally relative to spoiler 402. In particular, upper opening 412B extends for a first distance along the longitudinal extent of spoiler 402, lower opening 412A extends along the longitudinal extent of spoiler 402 for a second distance, and the second distance is greater than the first distance. Considered relative to the vehicle, upper opening 412B extends for a first distance along the lateral extent of vehicle 400, lower opening 412A extends along the lateral extent of vehicle 400 for a second distance, and the second distance is greater than the first distance. Spoiler 402 differs from spoiler 302 in that edges are not formed on a lower portion of spoiler 402 such that lower opening 412A is open at either end. Except as set forth above, the structure of spoilers 402 and 302 are substantially the same.

High-mounted stop light 404 is disposed within the spoiler chamber and illuminates through upper opening 412B. Since upper opening is centered relative to the vehicle as described above, high-mounted stop light 404 functions as a CHMSL. Rear ambient light 410 also is disposed with the spoiler chamber and illuminates through lower opening 412B. Rear ambient light 410 is disposed at a lower location than high-mounted stop light 404 and includes horizontal section 410A which extends substantially entirely across the length of rear windshield 401A. Therefore, high-mounted stop light 404 extends along a longitudinal extent of spoiler 402 which is substantially equal to the first distance described above, and rear ambient light 410 extends along the longitudinal extent of spoiler 402 substantially equal to the second distance described above. Considered relative to the vehicle, high-mounted stop light 404 is visible for a first distance along the lateral extent of vehicle 402, rear ambient light 410 extends along the lateral extent of vehicle 400 for a second distance, and the second distance is greater than the first distance. High-mounted stop light 404 is visible at a higher location of vehicle 400 than rear ambient light 410.

Rear ambient light 410 includes left and right portions of horizontal section 410A which extend laterally outwardly of outer component lower portion 408 spoiler 402 along the upper edge of rear windshield 401A. Rear ambient light 410 also includes two vertical sections 410B which extend downwardly from opposite ends of horizontal section 410A. Vertical sections 410B are disposed along the lateral sides of rear windshield 401A and are also exterior of spoiler 402. Vertical sections 410B are not formed as separate elements from horizontal section 410A. That is, rear ambient light 410 is a single element extending continuously along windshield 401A, and is visible throughout its entire length.

The invention claimed is:

1. A sport utility motor vehicle comprising:

a tailgate;

a spoiler attached to said tailgate, said spoiler including:

a center high-mounted stop light;

a rear ambient light;

a spoiler inner component; and a spoiler outer component, said spoiler inner component and said spoiler outer component defining a spoiler chamber therebetween, said center high-mounted stop light and said rear ambient light disposed within said spoiler chamber, said spoiler inner component secured to said tailgate, said spoiler outer component secured to said spoiler inner component, said spoiler outer component comprising a spoiler upper portion and a spoiler lower portion disposed beneath said spoiler upper portion, said spoiler lower portion and said spoiler upper portion each separately secured to said spoiler inner component, said spoiler upper portion defining an upper opening, said center high-mounted stop light disposed behind said upper opening, said spoiler upper portion and said spoiler lower portion jointly defining a lower opening, said rear ambient light disposed behind said lower opening, and said center high-mounted stop light incorporated into said spoiler at a location on said sport utility vehicle which is above said rear ambient light.

2. The motor vehicle recited in claim 1, said spoiler having a longitudinal extent, said center high-mounted stop light extending along said longitudinal extent for a first distance, said rear ambient light extending along said longitudinal extent for a second distance which is greater than said first distance.

3. A motor vehicle spoiler comprising:

a spoiler inner component;

a spoiler outer component secured to said spoiler inner component to define a spoiler chamber therebetween, said spoiler outer component comprising a spoiler upper portion and a spoiler lower portion disposed beneath said spoiler upper portion, said spoiler upper portion defining an upper opening, and said spoiler upper portion and said spoiler lower portion jointly defining a lower opening;

a high mounted stop light disposed within said spoiler chamber; and a rear ambient light secured within said spoiler chamber; wherein, said high-mounted stop light is disposed above said rear ambient light and behind said upper opening, and said rear ambient light is disposed behind said lower opening.

4. A motor vehicle comprising:

a tailgate;

a spoiler attached to said tailgate, said spoiler comprising:

a high-mounted stop light;

a rear ambient light;

a spoiler inner component; and a spoiler outer component, said spoiler inner component and said spoiler outer component defining a spoiler chamber therebetween, said spoiler outer component comprising a spoiler upper portion and a spoiler lower portion disposed beneath said spoiler upper portion, said spoiler upper portion defining an upper opening, said spoiler upper portion and said spoiler lower portion jointly defining a lower opening, wherein, said high mounted stop light and said rear ambient light are disposed within said spoiler chamber with said rear ambient light disposed behind said lower opening and said high-mounted stop light disposed behind said upper opening.

* * * * *